United States Patent [19]

Fox et al.

[11] 4,438,502

[45] Mar. 20, 1984

[54] OUTPUT PROCESSING SYSTEM FOR A DIGITAL ELECTRONIC MUSICAL INSTRUMENT

[76] Inventors: Hugh M. Fox, 61 Eastville Ter., Harrogate; Peter H. Sutcliffe, 71 Warwick Rd., New Barnet, both of England

[21] Appl. No.: 409,801

[22] Filed: Aug. 20, 1982

Related U.S. Application Data

[63] Continuation of Ser. No. 199,902, filed as PCT GB79/00208, Dec. 10, 1979, published as WO80/01215, Jun. 12, 1980, § 102(e) date Jul. 21, 1980, abandoned.

[30] Foreign Application Priority Data

Dec. 11, 1978 [DE] United Kingdom ............ 47901
Aug. 7, 1979 [DE] United Kingdom ......... 7927450

[51] Int. Cl.$^3$ .......................... G06F 1/02; G10H 1/06

[52] U.S. Cl. ...................................... 364/718; 84/1.01

[58] Field of Search ............... 364/718, 719, 720, 721, 364/722; 84/1.01, 1.03

[56] References Cited

U.S. PATENT DOCUMENTS

| | | | |
|---|---|---|---|
| 4,164,020 | 8/1979 | Griffth | 364/718 |
| 4,201,105 | 5/1980 | Alles | 84/1.01 |
| 4,213,185 | 7/1980 | Muri et al. | 364/721 |
| 4,217,802 | 8/1980 | Deforeit | 84/1.01 |
| 4,219,880 | 8/1980 | Nichols | 364/718 |
| 4,222,108 | 9/1980 | Braaten | 364/719 X |
| 4,254,681 | 3/1981 | Kugisawa | 84/1.01 |
| 4,297,933 | 11/1981 | Nishimoto | 364/718 |
| 4,342,245 | 8/1982 | Gross | 364/718 |
| 4,373,416 | 2/1983 | Endo et al. | 84/1.01 |

*Primary Examiner*—David H. Malzahn
*Attorney, Agent, or Firm*—Brooks & Kushman

[57] ABSTRACT

An output processor for an electronic musical instrument, is characterized by a data distribution network interconnecting data processing means and data storage means, wherein at least one such data storage means stores data from which a waveform of the desired sound may be derived; means for producing a plurality of microinstructions from which sets of data flow control signals may be derived, said data flow control signals determining the source and destination of data being handled by said distribution network; and means for storage and retrieval of a program of said microinstructions, said program effecting control of data flow in a manner such as to allow the generation of the desired sound. Preferably said program effects control of data flow in a manner which allows the substantially simultaneous generation of a plurality of waveforms.

2 Claims, 1 Drawing Figure

OUTPUT PROCESSING SYSTEM FOR A DIGITAL ELECTRONIC MUSICAL INSTRUMENT

This is a continuation of application Ser. No. 199,902, filed as PCT GB 79/00208, Dec. 10, 1979, published as WO80/01215, Jun. 12, 1980, § 102(e) date July 21, 1980 now abandoned.

FIELD OF THE INVENTION

This invention relates to musical sound generating systems and more particularly to output processing apparatus whose data-flow is controlled from a stored set of control instructions.

BACKGROUND TO THE INVENTION

Keyboard operated electronic musical instruments of the digital waveform synthesising type are well known, notable examples being U.S. Pat. Nos. 3,515,792, 3,809,786 and 3,639,913. When it is required to produce a polyphonic waveform synthesiser wherein several waveforms of different fundamental pitch, instantaneous amplitude and harmonic content are to be generated simultaneously, several options for implementation are open. One waveform generator could be assigned for each simultaneously sounded note up to some maximum number of allowable notes. This is expensive in production if the maximum allowable number is high. An alternative is to use time-sharing techniques using just one tone generator wherein each simultaneous note is given a discrete time slot in a repetitive sequence of time slots. U.S. Pat. No. 3,639,913 describes such a technique wherein the 'phase-angle calculator' and the wave-shape memory are shared by each simultaneously generated tone.

Control of data flow through such a time-shared system needs to be very precise in order for the system to perform correctly. As the maximum allowable number of simultaneously sounded notes increases so the logic circuitry for producing the necessary data flow control signals also increases. The implementation of this control signal logic is specific to the particular system which is being controlled and therefore only a "random logic" array comprising S.S.I. circuits or a dedicated and inflexible L.S.I. circuit can be used. The waveform generator therefore becomes expensive either due to the high volume of S.S.I. circuits required in production or the high pre-production investment in a special purpose L.S.I. controller.

SUMMARY OF THE INVENTION

It is an object of the present invention to implement a data distribution network between the data storing and data processing elements within the generating system wherein the data distribution network is controlled from a stored programme of control instructions, thus removing the need for specific logic S.S.I. circuits or a special purpose L.S.I. device.

It is a further object of this invention to control the data distribution network in a manner which reduces the number of data processing elements required by, for example, using the same arithmetic calculation element at more than one stage of an output calculation.

A further object of the invention is to enable more than one control algorithm to be performed, by selecting different stored microprograms dependent upon predetermined system requirements.

BRIEF DESCRIPTION OF THE DRAWINGS

An embodiment of the invention will now be described by way of example only and with reference to the accompanying drawing in which the single FIGURE.

Figure 1:
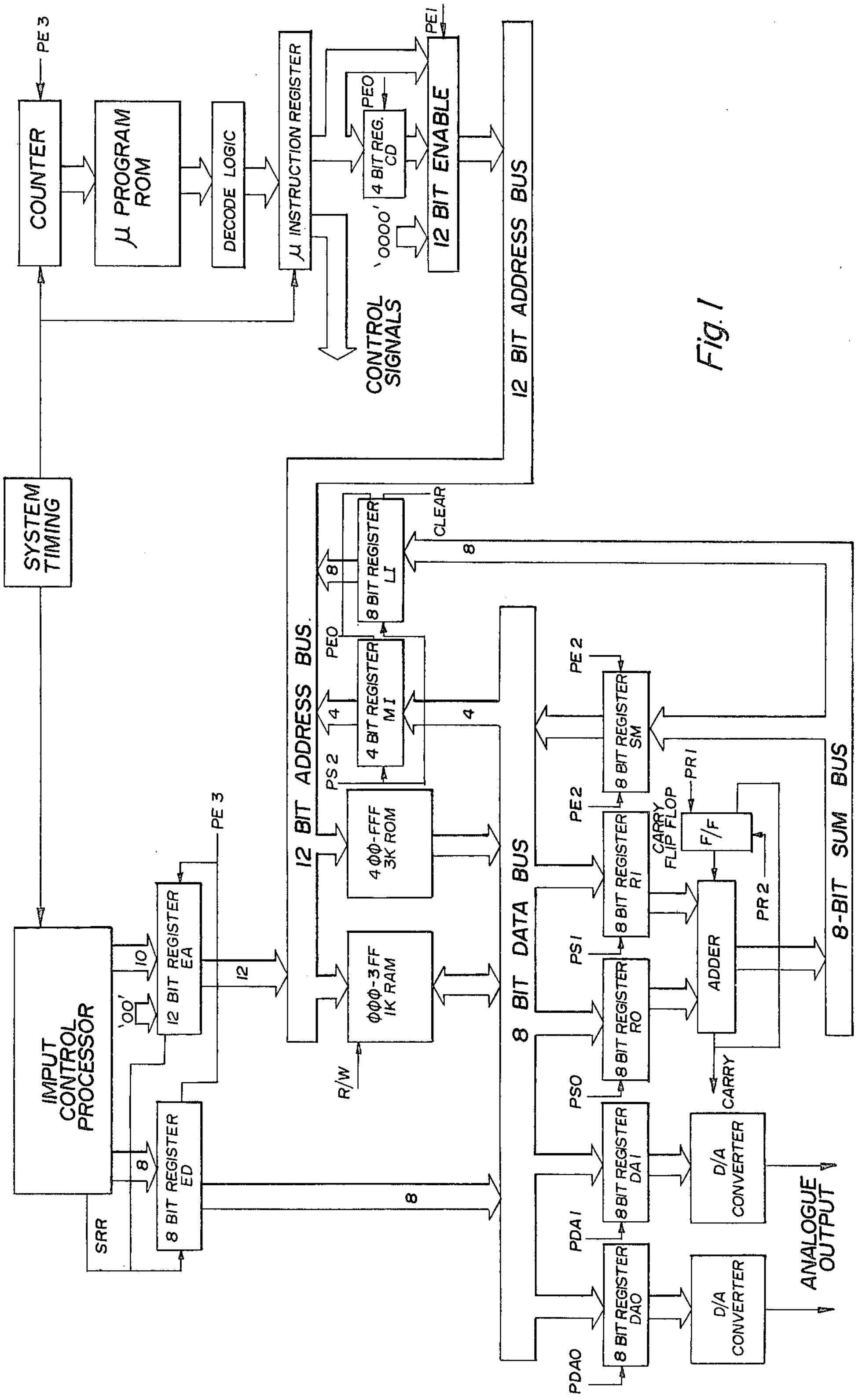
FIG. 1, shows a block diagram of an output control system (output processor) for an electronic musical instrument. Also referred to are.

Appendix 1: a table containing the instruction set of the output control system, and Appendix 2: a table containing the microprogram itself i.e. the order in which the microinstructions occur.

DETAILED DESCRIPTION OF FIG. 1

Referred to FIG. 1, the output control system uses an input control processor to supply its input information. The data storage devices used by the system include 1K byte RAM memory used as workspace and temporary storage and 3K byte ROM memory for holding waveshape tables and other information permanently required by the system. The data processing device comprises an 8 bit parallel adder with 'carry control'. Analogue outputs to a sound system (not described) are provided by two 8 bit Digital to Analogue converters of standard design. The data distribution network comprises:

(a) A 12 bit address bus.

(b) An 8 bit data bus.

(c) An 8 bit sum bus.

(d) Registers ED and EA (data and address from input controller).

(e) Registers DA0 and DA1 (output data to D-A converters).

(f) Registers R0 and R1 (Calculation data to the adder).

(g) Register SM (Sum to data bus transfer).

(h) Register LI (Sum to address bus transfer).

(i) Register MI (Data to address bus transfer).

The microprogram of control instructions is held in the microprogram ROM memory and is addressed directly from the construction counter shown in the FIGURE. The microprogram contains no 'jump' instructions except 'return to beginning of sequence' i.e. 'clear contour' Each microinstruction so accessed is appropriately decoded and held in the microinstruction register and this register contains both individual control signals and information relevant to RAM addresses. The RAM address is further controlled by register CD and is enabled onto the address bus via tri-state enable devices.

The timing of the input control processor and the output control system is derived from a common central timing clock.

It will be noted that all the registers, memory devices and the adder circuit are standard devices and will be familiar to those skilled in the art of digital engineering. A more detailed description of the internal workings of these 'building blocks' is therefore ommitted.

OPERATIONAL REQUIREMENTS OF THE OUTPUT CONTROL SYSTEM

By way of example only, a generating system is described herein which is similar in operating principle to that shown in U.S. Pat. Nos. 3,639,913 and 3,743,755 in terms of waveshape storage and access but improved in terms of polyphonic efficiency by way of microprogram—controlled data flow. It will be appreciated by those skilled in the art of digital musical instrument design that the same data flow control techniques could equally be applied to other operating principles such as the Fourier calculation technique described in U.S. Pat. No. 3,809,786.

The requirements for keyboard scanning and polyphonic note assignment are well known in the art and for ease of description of the present invention it is assumed that these requirements are fullfilled in a separate part of the musical instrument and that the input control processor shown in FIG. 1 is capable of supplying to the output control system the following information for each simultaneously sounded note.

(a) A frequency constant (equivalent to the 'phase-angle number' described in U.S. Pat. No. 3,639,913).

(b) The base address of the desired waveshape store or 'sound table' held in ROM in the output control system.

(c) The base address of the Logarithmic to Linear Conversion table held in ROM in the output control system.

(d) An attenuation value representing the amplitude modulation required on the waveshape in order to produce a desired sound envelope characteristic.

GENERAL OPERATIONAL DESCRIPTION

The particular embodiment being described produces up to four notes simultaneously. Each note can have a different sound characteristic (waveshape), frequency and amplitude relative to the other notes.

The system holds the waveshapes of various sounds in tabular form in ROM. The tables hold a single cycle of the sound split into 256 samples evenly distributed in the time domain. The samples hold the amplitude of the sound encoded in logarithmic form together with a sign bit.

The ROM also holds a table of 256 entries which converts logarithmic numbers to linear numbers.

The process of calculating the next output from the system takes a finite length of time. Let this be called the sample period. To produce a note of a particular frequency, a constant is added to an accumulating total (overflow being ignored) each sample period. The most significant eight bits of the accumulating total are used to address the relevant sound table to obtain the amplitude of the current sample. The relationship between the constant added for each sample period and the resultant frequency is as follows:

$$\text{Frequency} = \frac{\text{Constant}}{2^N \times \text{sample period}}$$

where N is the number of bits used in the addition. In this particular embodiment, N=16.

For high-frequency notes, successive entries in the sound table will be missed out between successive accesses of the sound table. For low-frequency notes, successive accesses of the sound table can produce the same sound table entry.

To the sample value retreived from the ROM is added a number, also held in logarithmic form, which represents the attenuation required on the note. The result of this addition is used to address the logarithmic-to-linear conversion table held in ROM. The value so obtained is the linear value of the current sample multiplied by the required attenuation value.

The above procedure is performed for each of the four notes and the resulting four values are added together to form the current sample period's output. This output is fed to a D-to-A converter to produce an analogue output.

The sequence of events described above is performed every sample period.

OPERATIONAL DESCRIPTION OF THE HARDWARE

The microprogram of the output control system contains no jumps, hence it can be addressed from the counter which is reset (PE3) at the end of the sequence. The output from the microprogram ROM is decoded, and then loaded into the microprogram instruction register, at the beginning of each microinstruction cycle of the system. The microinstruction register contains address information and control information to perform the instruction repertoire of the output control system.

Information is transferred from the input control processor to the RAM of the output control system by the input control processor simultaneously loading registers ED and EA (by load pulse SRR). The ED is loaded from the DATA bus and the EA register is loaded from the least significant ten bits of the ADDRESS bus of the input control processor. A specific microinstruction is used to enable register EA onto the ADDRESS bus (PE3) and register ED onto the DATA bus and effect a 'write' cycle in the RAM. The microinstruction may be performed several times before the contents of ED and EA are changed, but this has no effect since the information in question is not changed by the output control system itself.

The ROM is split into twelve 256-byte tables each starting at address NØØ (Hex) where N is the table number.

The only RAM addresses used in this system are ØØØ to Ø3F, which, for ease of programming, are conceptually split into four blocks of 16 bytes. Each of the four notes 'played' concurrently by the system is allocated one of these blocks, (numbered 0–3). The information stored in a block is as follows:

| | |
|---|---|
| 0 | least significant byte of constant |
| 1 | most significant byte of constant |
| 2 | attenuation of note |
| 3 | base address of sound table |
| 4 | base address of log/linear table |
| 5 | unused |
| 6 | unused |
| 7 | unused |
| 8 | least significant byte of accumulating total |
| 9 | most significant byte of accumulating total |
| A | workspace |
| B | zero (note 0 only) |
| C | unused |
| D | unused |
| E | unused |
| F | unused |

Addresses 0 and 1 contain the 16-bit constant added to the accumulating total (addresses 8 and 9) each sample period. Address 2 contains the attenuation value of the note in logarithmic form. The most significant seven bits are used and the attenuation value is held in 1's complement form. The least significant bit is set to zero.

The least significant four bits of address 3 contain the table number holding the required sound table. The contents of the table are in logarithmic form. The most significant seven bits are used, the least significant bit holds the sign.

The least significant four bits of address 4 contain the table number holding the log-to-linear conversion table. The contents of this table are in conventional form, the most significant bit being the sign bit. Addresses 8, 9 and A are used as workspace by the output control processor; address B in block 0 must be set to zero by the control processor.

The instructions that can be performed by the output control system are tabled as appendix 1, which is given at the end of this specific description and is intended to be read in conjunction with the block diagram of FIG. 1. Instructions EY and FX clear the microprogramme counter at the end of the cycle, when the next instruction is loaded into the microinstruction register, hence one more instruction is executed before the first instruction of the sequence of instructions (at address zero) is fetched.

Registers MI and LI form an indirect register which is used to access the sound tables held in the ROM. It will be noted that some tables could also be held in the unused portion of the RAM, provided they were first entered there by the input control processor.

Register CD, and the least significant four bits of certain instructions, form the direct register for accessing the first 256 bytes of RAM.

Manipulation of the carry flip-flop is required for multiple-length working. The requirement to clear register LI when carry is not set is explained later.

OPERATIONAL DESCRIPTION OF THE SOFTWARE

The data flow and microprogram instruction set of the output control system allows for a large variety of output algorithms other than the one described in this particular embodiment. The program used for the device being described is given at the end of the overall description as Appendix 2 but it will be appreciated that more or less notes, and such things as stereo output, could easily be incorporated into it.

The program tables in Appendix 2 consists of four similar sections each one generating one of the four notes.

The first section (counter value 0 to D) generates the sample value for note zero in RAM location 1A. The section is entered with register CD containing zero and the carry flip-flop clear. Location 0B has previously been set to zero by the input control processor, which has also set the required values in addresses 00 to 04, 10 to 14, 20 to 24 and 30 to 34.

The first seven instructions (counter values 0 to 6) add the double length frequency constant to the double length accumulating total. This is done by using the carry flip-flop.

Instruction 5 loads the indirect register with the address of the required sound sample. Instruction 7 fetches the sample into register 0 (the contents of CD are not changed even though it is loaded). Instructions 8 and 9 add the attenuation to the sample and put into the indirect register the address of the calculated entry in the logarithmic-to-linear conversion table.

Since the attenuation value is held in "1's complement" form, the result of the calculation will be to cause a carry from the adder if the sample value is larger than the required attenuation: if the reverse is true, underflow occurs and carry is not generated. Instruction A clears the LI register if underflow occurred, the base value of the log/linear conversion table contains no output.

Since the least significant bit of the sound sample is the sign bit, and the least significant bit of the attenuation value is zero, and that for the addition the carry flip-flop is clear, the sign bit of the result is the same value as that of the sound sample.

Instruction A also enters information from the input control processor into the RAM. Instruction B loads zero into register 0 (since the input control processor sets RAM address 0B to zero). Instruction C enters the linear value of the computed sound sample modified by the attenuation into register 1 and updates the contents of register CD in anticipation of the sequence for calculating the sample for note 1. Instruction D puts the computed value for note 0 into RAM address 1A (since R0 contains zero).

The sequence for the remaining three notes is similar to that described above, except that instructions 19 to 1B, 27 to 29 and 35 to 37 are used to add the four derived samples together. The result of this addition process is loaded into the D to A converter register by instruction 38.

Instruction 37 clears the microprogram sequence counter, thus causing the complete sequence to be recommenced after instruction 38.

Thus, in the manner described above the output control system simultaneously generates up to four notes each of which can have different sound characteristics with respect to each other. It will be appreciated that having structured the data flow in such a system the flexibility of control algorithm which may be performed is greatly enchanced by storing several different microprogrammes each written from the same instruction set. It will also be apparent that if the selection of these microprograms is controlled by the input control processor a different control algorithm could be performed dependent upon some specific requirement of the input. An example of the improvement that this could have is explained as follows:

In a polyphonic sound generator having a maximum allowable number of simultaneously played notes of 16 and using a fixed, dedicated data flow control technique as described in the prior art examples, certain compromises to the accuracy of synthesis may have to be made. This is due to the processing time constraints put on by the logic device types used to implement the system. In such a generator these compromises will still be present even if only one note is to be sounded at any given time. Whilst these compromises may not be noticed when 16 notes are simultaneously played due to the overall complexity of the sound, they may be discernable when, for example, an unaccompanied solo is performed. Using the improvements described in the present invention different control algorithms due to different microprograms could be selectable and dependent upon the number of simultaneously sounded notes required at any given time. This can result in a higher accuracy of synthesis the fewer the simultaneous notes required, since more processing time can be made available under these circumstances.

APPENDIX 1

MICROPROGRAM INSTRUCTION SET FOR OUTPUT CONTROL SYSTEM

| Instruction Code (HEX) | Function | Description | Control Signals Produced |
|---|---|---|---|
| 1Y | Ram→RO | Load RO with contents of RAM address | PE1<br>PSO<br>READ |

APPENDIX 1-continued

MICROPROGRAM INSTRUCTION SET FOR OUTPUT CONTROL SYSTEM

| Instruction Code (HEX) | Function | Description | Control Signals Produced |
|---|---|---|---|
| | | OZY (HEX) where Y is least significant 4 bits of instruction and Z is contents of reegister CD. | |
| 5Y | RAM→R1 | Load R1 with contents of RAM address OZY. | PE1 PS1 READ |
| 9Y | RAM→MI: SM→LI | Load MI with least significant 4 bits contained in RAM addreess OZY. LI is loaded with contents of SUM BUS. | PE1 PS2 READ |
| DY | RAM→DA | DA output register selected by least significant bit of Y is loaded with contents of RAM address OZY. | PE1 PDAO or 1 READ |
| 2Y | SM→RAM | Load RAM address OZY with contents of SUM BUS. | PE1 PE2* WRITE |
| 6Y | SM→RAM: strobe carry F/F | Load RAM address OZY with contents of SUM BUS and enter current carry value out of adder into carry flip-flop. | PE1 PE2* WRITE PR1 |
| AY | SM→RAM: clear carry F/F | Load RAM address OZY with contents of SUM BUS and clear carry flip-flop. | PE1 PE2* WRITE PR2 |
| EY | SM→RAM: clear counter | Load RAM address OZY with contents of SUM BUS and set microprogramme counter to zero. | PE1 PE2* WRITE PR3 |
| OZ | (I)→RO: Z→CD | RO is loaded with contents of adddress contained in MI and LI; CD is loaded with Z, Z being least significant 4 bits of instruction. | PEO PSO READ |
| 4Z | (I)→R1: Z→CD | R1 is loaded with contents of address contained in MI and LI; CD is loaded with Z. | PEO PSO READ |
| CZ | (I)→DA: Z→CD | D to A output register selected by least significant bit of Z is loaded with contents of address contained in MI and LI: CD is loaded with Z. | PEO PDAO or 1 READ |
| 3X | ED→(EA): LI = LI × carry | Contents of ED are loaded into RAM address contained in EA: LI is cleared if carry out of adder is zero: X is not decoded as part of instruction and therefore can be any Hex value. | PE3 CLEAR = CARRY PE3 WRITE |
| FX | ED = (EA) LI = LI × carry; clear counter | Contents of ED are loaded into RAM address contained in EA; LI is cleared if carry out of adder is zero; microprogramme counter is set to zero. | PE3 CLEAR = CARRY PE3 PR3 WRITE |

*Contents of sum bus are loaded into register at the beginning of the cycle in case the sum bus changes value during the cycle due to changes to the carry flip-flop.

APPENDIX 2

MICROPROGRAM FOR THE OUTPUT CONTROL SYSTEM

| Counter Value (HEX) | Instruction Code (HEX) | Function | Comments |
|---|---|---|---|
| 0 | 10 | 00→RO | Update accumulating total of note 0 |
| 1 | 58 | 08→R1 | |
| 2 | 68 | SM→08: strobe carry F.F. | |
| 3 | 11 | 01→RO | |
| 4 | 59 | 09→R1 | |
| 5 | 93 | 03→MI: SM→LI | |
| 6 | A9 | SM→09: clear carry F.F. | Get current sample value from relevant sound table into RO |
| 7 | 00 | (I)→R0: 0→CD | |
| 8 | 52 | 02→R1 | Add attenuation and set up pointer to log/linear table |
| 9 | 94 | 04→MI: SM→LI | |
| A | 30 | ED→(EA): LI = LI × carry →LI | Input value from control processor, clear LI if carry from adder is not set |
| B | 1B | 0B→RO | Get linear value of note 0: add to zero (0B is set to zero): store result in 1A; load CD with base address of RAM block for note 1 |
| C | 41 | (I)→R1: 1→CD | |
| D | 2A | SM→1A | |
| E | 10 | 10→RO | Update accumulating total for note 1 |
| F | 58 | 18→R1 | |
| 10 | 68 | SM→18: strobe carry F.F. | |
| 11 | 11 | 11→RO | |
| 12 | 59 | 19→R1 | |
| 13 | 93 | 13→MI: SM→LI | |
| 14 | A9 | SM→19: clear carry F.F. | Get current sample value from relevant sound table into RO |
| 15 | 01 | (I)→RO: 1→CD | |
| 16 | 52 | 12→R1 | Add attenuation and set up pointer to log/linear table |
| 17 | 94 | 14→MI: SM→LI | |
| 18 | 30 | ED→(EA): LI = LI × | Input value from control processor, |

APPENDIX 2-continued

MICROPROGRAM FOR THE OUTPUT CONTROL SYSTEM

| Counter Value (HEX) | Instruction Code (HEX) | Function | Comments |
|---|---|---|---|
| | | carry →LI | clear LI if carry from adder is not set |
| 19 | 1A | 1A→RO | Get linear value of note 1: add to note 0: store result in 2A: load CD with base address of RAM block for note 2 |
| 1A | 42 | (I)→R1: 2→CD | |
| 1B | 2A | SM→2A | |
| 1C | 10 | 20→RO | Update accumulating total for note 2 |
| 1D | 58 | 28→R1 | |
| 1E | 68 | SM→28: strobe carry F-F | |
| 1F | 11 | 21→RO | |
| 20 | 59 | 29→R1 | |
| 21 | 93 | 23→MI: SM→LI | |
| 22 | A9 | SM→29: clear carry F-F | Get current sample value from relevant sound table into RO |
| 23 | 02 | (I)→RO: 2→CD | |
| 24 | 52 | 22→R1 | Add attenuation and set up pointer to log-linear table |
| 25 | 94 | 24→MI: SM→LI | |
| 26 | 30 | ED→(EA): LI = LI × carry →LI | Input value from control processor; clear LI if carry from adder is not set |
| 27 | 1A | 2A→RO | Get linear value of note 2: add to current total of notes 0 and 1: store result in 3A: load CD with base address for note 3 |
| 28 | 43 | (I)→RI: 3→CD | |
| 29 | 2A | SM→3A | |
| 2A | 10 | 30→RO | Update accumulating total of note 3 |
| 2B | 58 | 38→R1 | |
| 2C | 68 | SM→38: strobe carry F-F | |
| 2D | 11 | 31→RO | |
| 2E | 59 | 39→R1 | |
| 2F | 93 | 33→MI: SM→LI | |
| 30 | A9 | SM→39: clear carry F-F | Get current sample value from relevant sound table into RO |
| 31 | 03 | (I)→RO: 3→CD | |
| 32 | 52 | 32→RI | Add attenuation and set up pointer to log/linear table |
| 33 | 94 | 34→MI: SM→LI | |
| 34 | 30 | ED→(EA): LI = LI × carry →LI | Input value from control processor; clear LI if carry from adder is not set |
| 35 | 1A | 3A→RO | Get linear value of note 3: add to total of notes 0, 1 and 2: store result in OA: load CD into base address of RAM block for note 0: clear microprogramme counter |
| 36 | 40 | (I)→R1: 0→CD | |
| 37 | EA | SM→0A clear counter | |
| 38 | DA | OA→DAO | Output total of 4 notes to D-to-A converter |

We claim:

1. A sound producing system for a polyphonic electronic musical instrument, the system being responsive to digital input signals relating at any given time to frequency, amplitude and waveform selection for each of the notes sounding concurrently at that time and comprising:

an input signal digital storage circuit for storing said digital input signals and means for loading said digital input signals into said storage circuit;

a wave shape digital storage circuit containing tabular digital information representative of each of a plurality of wave shapes;

a data processing circuit comprising data register and adder means;

means interconnecting the digital storage circuits and the data processing circuit for the transfer of information therebetween;

a microcode instruction register;

storage means storing at least one fixed sequence of microinstructions;

microinstruction address sequencing means operable in each one of a consecutive series of sample periods of equal duration to cause in each sample period the sequential loading into said microcode instruction register of the entirety of one fixed sequence of microinstructions without dependence on the input signals present during said sample period;

means connecting said microcode instruction register to said storage circuits and to said data processing circuit whereby signals from said microcode instruction register control the transfer of information between said circuits and the manipulation of information within said ciruits so as to calculate the current value of all notes sounding within said sample period;

a converter circuit comprising a register and a digital to analogue converter; and means applying said current value to said converter circuit so as to produce an analogue signal representative of the required sound during said sample period.

2. A sound producing system as claimed in claim 1 in which said storage means stores a plurality of different fixed sequences of microinstructions each effecting different control of the transfer and manipulation of information and said microinstruction address sequencing means comprises selecting means for selecting a desired one of said fixed sequences in response to the particular input signals present at the start of said sample period, said selected fixed sequence being loaded in its entirety into said microcode instruction register during that sample period.

* * * * *